(12) United States Patent
Anthuvan et al.

(10) Patent No.: US 12,107,737 B2
(45) Date of Patent: Oct. 1, 2024

(54) METHOD AND SYSTEM TO OPTIMIZE PERFORMANCE AND DETERMINE END OF LIFE OF EDGE DEVICES OF AN INTERNET OF THINGS NETWORK

(71) Applicant: Dell Products L.P., Round Rock, TX (US)

(72) Inventors: Felix Stephen Anthuvan, Dharmapuri (IN); Rajeev Arakkal, Kozhikode (IN); Sachin Apagundi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/973,937

(22) Filed: Oct. 26, 2022

(65) Prior Publication Data
US 2024/0146617 A1    May 2, 2024

(51) Int. Cl.
*G06F 15/173*    (2006.01)
*H04L 41/149*    (2022.01)
*H04L 41/16*     (2022.01)

(52) U.S. Cl.
CPC .......... *H04L 41/149* (2022.05); *H04L 41/16* (2013.01)

(58) Field of Classification Search
CPC .................... H04L 41/149; H04L 41/16
See application file for complete search history.

(56) References Cited

U.S. PATENT DOCUMENTS

2020/0033831 A1*  1/2020  Tauschinsky ........ G05B 23/024
2023/0075065 A1*  3/2023  Ivenso ................ G06N 20/00

* cited by examiner

*Primary Examiner* — Padma Mundur
(74) *Attorney, Agent, or Firm* — Terrile, Cannatti & Chambers, LLP; Emmanuel A. Rivera

(57) ABSTRACT

Described herein are methods and a system for that monitors the performance, and provides reporting including replacement of IoT edge devices in an edge computing network. Data is received by an AI/ML model from multiple IoT edge devices which is process in time series. Analysis services and engines determine the performance of the multiple IoT edge devices. Severity and weightage are applied to the data, and algorithms determine performance and replacement recommendations.

17 Claims, 6 Drawing Sheets

400

| Category | Controls | Severity | Weightage |
|---|---|---|---|
| Device Configurations 410 | Outdated - non upgradable Software | High | 10 |
| | Known CVE on Device Software | High | 7 |
| | Software upgrade fails frequently | High | 10 |
| | Known Hardware limitations/bugs | High | 9 |
| | Age of the Device | Low | 3 |
| Data Quality 412 | Un even data transmission intervals | High | 8 |
| | Un even data volume getting transmitted | Medium | 5 |
| | Transmitting unknown or unidentifiable data | High | 10 |
| | Long time since supported data send | High | 10 |
| | Unknown/unidentifiable access details present | High | 10 |
| Security Status & Skills 414 | Identified security vulnerabilities (insecure conf) multiple instance | High | 10 |
| | Software supports/ Capable to remotely enforce security policies | Medium | 6 |
| | Supports unauthenticated access | High | 10 |
| | Last Security audit device status vulnerable | High | 10 |
| | Long time since device is audited for security | Medium | 6 |
| | Device doesn't support encryption/encoding | Medium | 7 |
| | Device Doesn't support secure transportation protocols | Medium | 7 |
| Maintenance & Recovery 416 | Device doesn't capable to report incidents remotely | Medium | 5 |
| | Long time since the Device logs are sent | High | 8 |
| | Frequent detection of unauthorized access attempt in logs | High | 10 |
| | Device doesn't support data caching during offline | High | 8 |
| | Device doesn't support data recovery in case unexpected component failure | High | 10 |

404 – Category
402 – Controls
406 – Severity
408 – Weightage

*Figure 4*

Device Health rating algorithm

Derive the current risk of the device using below mathematical model

| Controls Severity → | High | Medium | Low |
|---|---|---|---|
| High Risk | >= 20% of high controls is unsafe | >=50% medium severity controls are unsafe | >=50% medium severity controls are unsafe |
| Medium Risk | Not in High Risk | Not in Medium Risk | |
| Low Risk | Not in High Risk | | |
| Healthy/safe | Devices doesn't fall under any of the risk categories are healthy | | |

*Figure 5*

METHOD AND SYSTEM TO OPTIMIZE PERFORMANCE AND DETERMINE END OF LIFE OF EDGE DEVICES OF AN INTERNET OF THINGS NETWORK

BACKGROUND OF THE INVENTION

Field of the Invention

The present invention relates to optimizing performance and determining end of life of edge devices in an Internet of Things (IoT) network. More specifically, embodiments of the invention provide for monitoring and determining health, and performance of IoT edge devices.

Description of the Related Art

Internet of Things (IoT) edge computing is a growing and developing technology, allowing machines and devices to communicate with one another. Internet of Things (IoT) refers to the process of connecting physical objects to the Internet. IoT generally refers to a system of physical devices or hardware that receive and transfer data over networks. A typical IoT system works by continuously sending, receiving, and analyzing data in a feedback loop.

IoT benefits from having computing power closer to where a physical device or data source actually exists. In order for the data produced by IoT devices to react faster or mitigate issues, data is analyzed at the edge, instead of going to a central site before analysis takes place. Edge computing takes place at or near the physical location of either the user or the source of the data.

IoT edge computing can be implemented as a local source of processing and storage for data and computing needs of IoT devices. Benefits of using IoT devices with IoT edge devices can include a reduced latency of communication between IoT devices and the central IT networks; increased response times and greater operational efficiency; and improvement of network bandwidth; continuation of systems operation offline when a network connection is lost; and local data processing, aggregation, and rapid decision IoT edge devices or edge devices are physical hardware located in remote locations at the edge of the network with enough memory, processing power, and computing resources to collect data, process that data, and execute upon it in almost real-time with limited help from other parts of the network. An IoT device can be a physical object connected to the Internet, and is a source of data to be analyzed. The edge device is where the data is collected and processed.

IoT devices, or IoT sensors, can be deployed over a global scale, collecting large amounts of data for analysis for critical decision-making processes, and can be important in many computing applications, including cloud computing. When implementing IoT edge computing, it is necessary to determine the performance and operations of critical IoT edge devices. Entities (e.g., companies) can have considerable investment in IoT edge computing infrastructures. Entities desire to be able to determine faulty IoT edge devices, detect performance, including accuracy degradation over a period due to various factors and failures of IoT edge devices, determine the risk of continuing to use degraded or faulty IoT edge devices, etc. With such knowledge regarding current and expected lifetime operation of its IoT edge devices, an entity can is able to decide whether and when to replace or upgrade the IoT edge devices.

SUMMARY OF THE INVENTION

A computer-implementable method, system and computer-readable storage medium for monitoring the performance of IoT edge devices comprising: receiving data by an AI/ML model from multiple IoT edge devices in an edge computing network through an API gateway; processing the data in time series with a data processing component of the AI/ML model; analyzing the processed data with analysis engines of the AI/ML model, wherein the analysis engines include services and engines to determine performance of the IoT devices based on the processed data; determining severity and weightage of the processed and analyzed data by the AI/ML model; and applying algorithms of the AI/ML model to the data with severity and weightage to provide performance metrics and replacement recommendations

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 4 is a table of data, categories, severity and weightage;

FIG. 5 is a process algorithm for data; and

DETAILED DESCRIPTION

Implementations described herein provide for an artificial intelligence/machine learning model to provide timely information as to allow decision making as to IoT edge device maintenance and repair. The information further allows predicting and planning for replacement (retirement) of IoT edge devices based on collected data. Implementations provide for multidimensional data gathering and processing that segregates data into different categories, evaluates IoT edge device health, by inspecting data in a data series pipeline.

An AI/ML based model predicts a calculation of Residual Lifetime (RLT) based on, IoT edge device service history, IoT edge device retirement suggestion, IoT edge device frequent failure over a warranty period, knowledge base data, etc.

Informed decision making can allow determining different repair or replacement options for IoT edge devices and provide for a consistent and high performing edge computing network.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
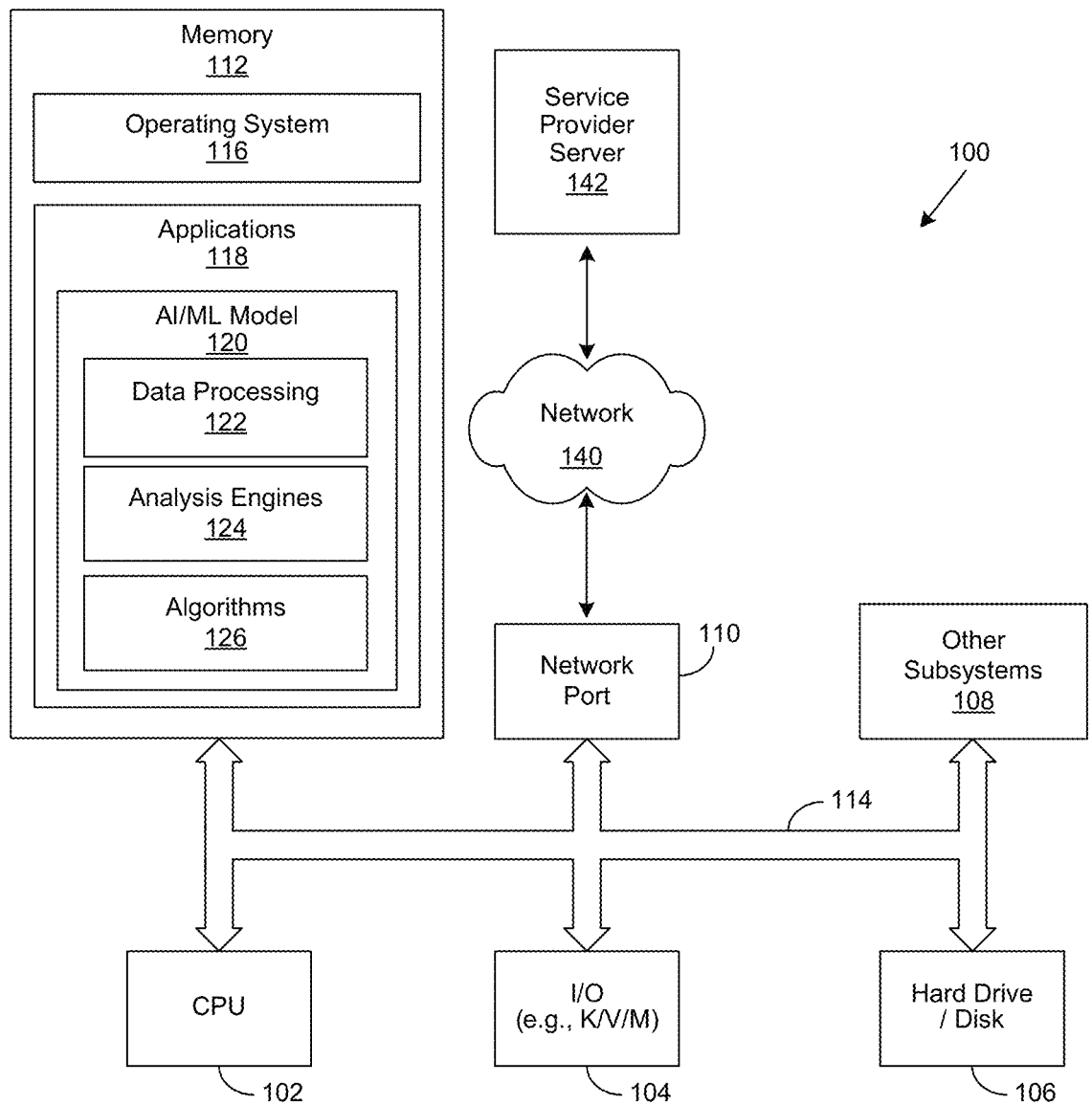
FIG. 1 is a general illustration of components of an information handling system as implemented in the present invention.

FIG. 1 is a generalized illustration of an information handling system (IHS) 100 that can be used to implement the system and method of the present invention. The information handling system (IHS) 100 can be a host to the peripheral devices described herein.

The information handling system (IHS) 100 includes a processor (e.g., central processor unit or "CPU") 102, input/output (I/O) devices 104, such as a microphone, a keyboard, a video display or display device, a mouse, and associated controllers (e.g., K/V/M), a hard drive or disk storage 106, and various other subsystems 108.

In various embodiments, the information handling system (IHS) 100 also includes network port 110 operable to connect to a network 140, where network 140 can include one or more wired and wireless networks, including the Internet. Network 140 is likewise accessible by a service provider server 142.

The information handling system (IHS) 100 likewise includes system memory 112, which is interconnected to the foregoing via one or more buses 114. System memory 112 can be implemented as hardware, firmware, software, or a combination of such. System memory 112 further includes an operating system (OS) 116 and applications 118. Implementations provide for applications 118 to include an artificial intelligence/machine learning (AI/ML) model 120. In various embodiments, the AI/ML model 120 includes a data processing component 122, analysis engines 124, and algorithms 126. The AI7/ML model 120, the data processing component 122, the analysis engines 124, and the algorithms 126 are further described herein, and in particular to the processes that they support.

Figure 2:
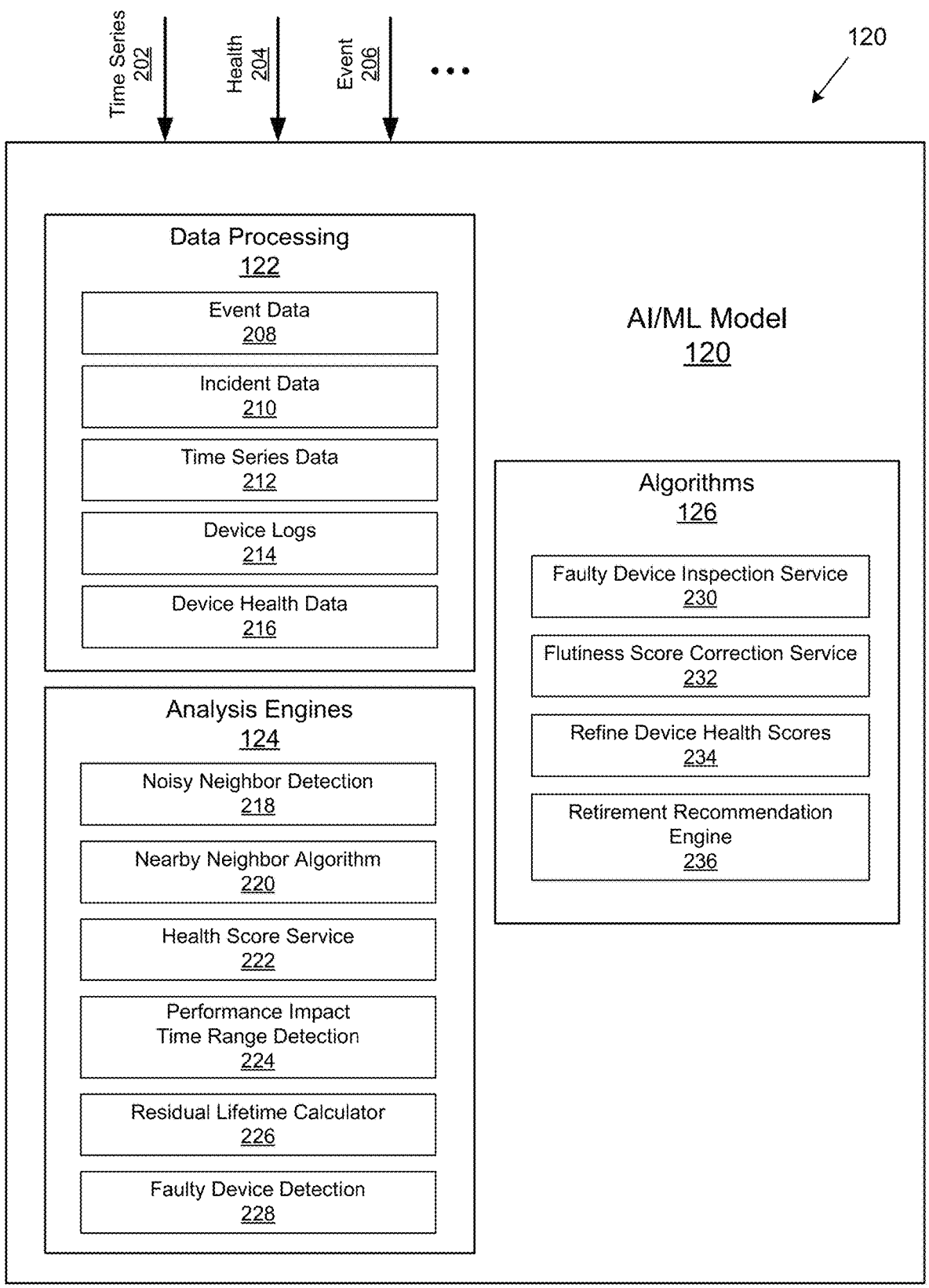
FIG. 2 is an artificial intelligence/machine learning (AI/ML) model as implemented in the present invention.

FIG. 2 shows an example configuration of the AI/ML model 120. As described, implementations provide for the AI/ML model 120 to include the data processing component 122 and the analysis engines 124. As further described herein, the AI/ML model 120 be embodied in various computing configurations, including the information handling system (IHS) of FIG. 1, as well as cloud computing.

Implementations provide for the AI/ML model 120 to receive data from IoT edge devices, and particularly samples of data, such as time series data 202, health data 204, event data 206, etc. Implementations as to the processes as to how the data (e.g., time series data 202, health data 204, event data 206, etc.) is received is further described herein.

Implementations further provide for the data (e.g., time series data 202, health data 204, and event data 206) to be processed using the data processing component 122, into particular data, for example event data 208, incident data 210, time series data 212, devices logs 214, and device health data 216. Other data can also be processed. Data is processed in a time series to assure data events are properly sequenced and ordered.

Implementations provide for the analysis engines 124 to perform analysis on the processed data (e.g., event data 208, incident data 210, time series data 212, devices logs 214, and device health data 216). Analysis engines 124 can include engines/services such as noisy neighbor detection 218, which can determine if an IoT edge device showing a problem actually has a problem, by checking neighbor IoT device(s). Other example engines/services of analysis engines 124 can include a nearby neighbor algorithm 220, health score service 222, performance impact time range detection 224, residual lifetime calculator 226, and faulty device detection 228. Other services/engines can also be included. The output of the engines/services of analysis engines 124 is further described herein.

Implementations provide for the data from analysis engines 124 to be received by algorithms 126, which can include services and engines that provide performance metrics, retirement metrics, and recommendations. For example, faulty device inspection service 230 identifies faulty devices, flutiness score correction service 232 identifies score correction, refine health score service 234 identifies health scores, retirement engine 236 identifies/recommends retirement. Other services and engines can be provided as well.

Figure 3:
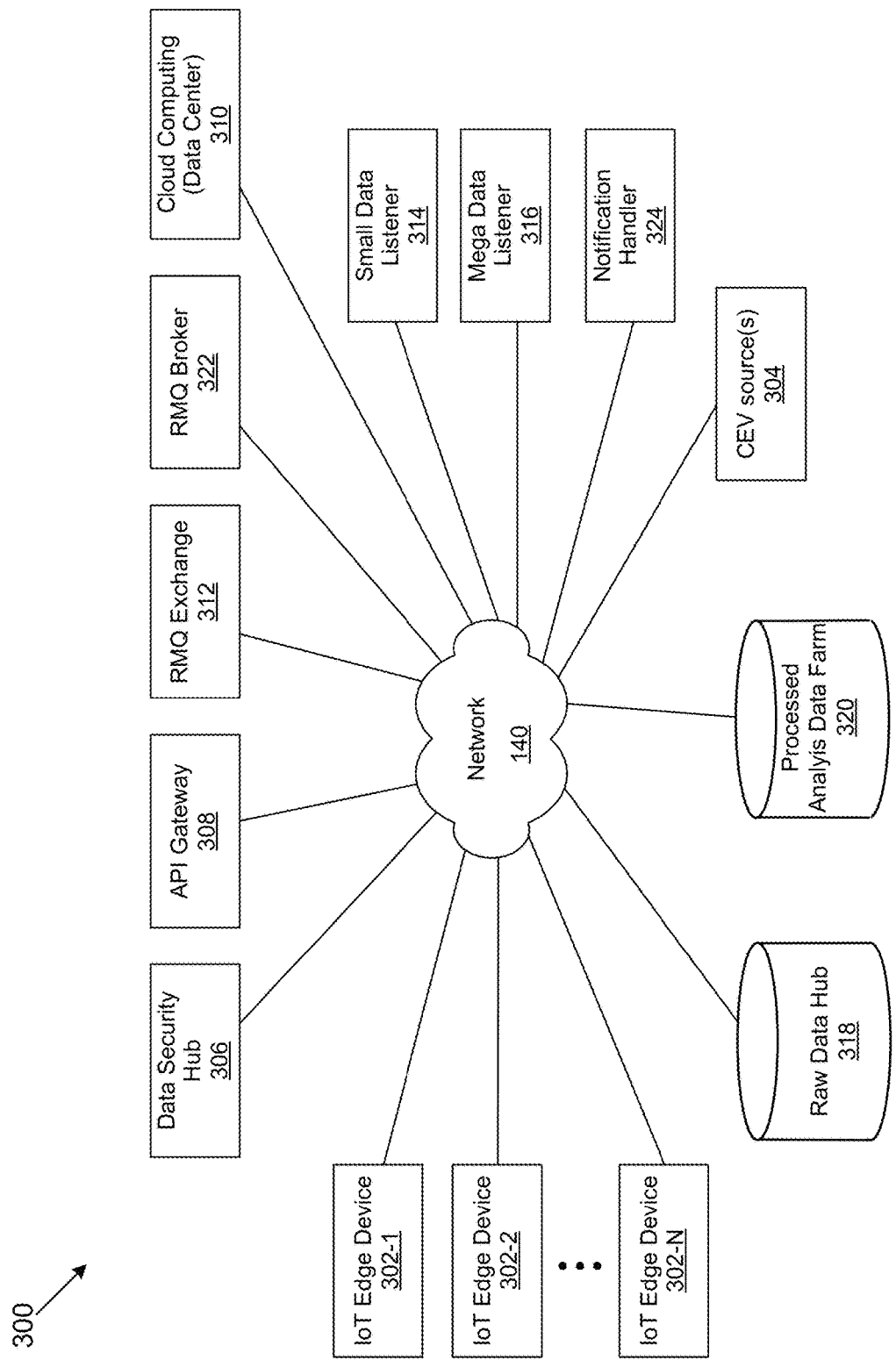
FIG. 3 illustrates a system as implemented in the present invention.

FIG. 3 illustrates a system 300 for monitoring and determining health and performance of IoT edge devices 302. The system 300 includes multiple IoT edge devices 302. IoT edge devices 302 are part of a edge computing network, and provide entry points to IoT devices to the edge computing network. Examples of IoT edge devices 302 can include routers, routing switches, integrated access devices (IADs), multiplexers, and a variety of metropolitan area network (MAN) and wide area network (WAN) access devices, etc.

In various implementations, the IoT edge devices 302 connect to network 140. As described, network 140 can include one or more wired and wireless networks, including the Internet. In various embodiments, the system 300 provides for network 140 to connect the elements described shown and described in FIG. 3.

Referring now to FIG. 4. Table 400 is an example of data, categories, severity and weightage. Table 400 includes a column "controls" 402 which includes example data from IoT edge devices 302. In various implementations, "controls" 402 can also include Common Vulnerabilities and Exposures (CVE) data from CVE source(s) 304, which can be public sources or accessible websites. A CVE identifies known issues as to particular make and model of IoT edge device 302.

The health status of IoT edge devices can be confirmed and correlated against known CVE from external sources, such as CVE source(s) 304. CVE can be identified by identification model, description, a known reference such as to a public cybersecurity vulnerability, known issues as to make and model of IoT edge device which can be supported by an ML algorithm(s), etc.

Referring back to FIG. 3, implementations provide for data from the IoT edge devices 302 to go through a data security hub 306. An application program interface (API) gateway 308 receives the data. Embodiments provide for the API gateway 308 to include the data processing component 122 and the analysis engines 124 described in FIG. 2. Therefore, in such embodiments, the API gateway 308 through the data processing component 122 and the analysis engines 124 analyzes the data using the data processing component 122 and the analysis engines 124 to determine health rating, nearby device data comparison, data similarity, data deviation, risk patterns from expected averages, etc., and characterize the IoT edge devices 302.

As discussed above, implementations provide for the data processing component 122 and the analysis engines 124 to be part of the AI/ML model 120. In general, the data received as input to the AI/ML model 120 (the data processing component 122) includes data or feature sets as to state of an IoT edge device 302, time received, error messages, category, frequency, CVSS, nearby device error status, error probability, severity of error, etc. CVSS is known in the industry as a common vulnerability scoring system and provides a framework for communicating, for example characteristics and severity vulnerabilities as to devices (i.e., IoT edge devices 302). CVSS can be derived from base (weightage) metric attributes as to confidentiality impact, integrity impact, availability impact, etc. from an error of an IoT edge device 302. Error probably can be derived from a deviation that occurs based on data and risk patterns of an expected average. Base industry standard metrics for CVSS can be used to calculate severity and weightage, which can be based on subject matter expert inputs and are added to controls of "controls" 402 of Table 400. The calculation of severity and weightage can be static. Referring to FIG. 4, table 400 shows controls (data) and related severity 406 and weightage 408.

Referring to FIG. 3, therefore, implementations provide for the AI/ML model 120 to be trained based on input data, such as logs from IoT edge devices 302. As discussed, embodiments can provide for the AI/ML model 120 (data processing component 122 and the analysis engines 124) to be implemented in API gateway 306. Embodiments can also provide for the AI/ML model 120 (data processing component 122 and the analysis engines 124) to be implemented as part of cloud computing 310. API gateway 308 can be implemented as an IHS 100 as described in FIG. 1. It is understood that that cloud computing 310 can be implemented as distributed computing resources, such as IHS 100.

In various implementations, data from IoT edge devices 302 is received at an RMQ exchange 312. Implementations provide for such data can be passed from the API gateway 308 prior to being processed by AI/ML model 120. Data from RMQ exchange 312 can be sent to and received by a small data listener 314 and mega data listener 316, where the data is separated into small data and mega data. Small data can include small sets of data, such as events and logs of the IoT edge devices 302. Separating data can allow for more efficient processing and analyzing. In particular, small sets of data are processed and analyzed by the AI/ML model 120.

Implementations provide for small data and large data to be stored at a raw data hub 318 for future processing and analysis. The data hub 318 can be configured as a Common Internet File System (CFS) or Network File System (NFS).

Referring to FIG. 2, small data can be received as time series data 202, health data 204, event data 206, etc. and processed and analyzed at the AI/ML model 120 as described above. The AI/ML model 120 is considered a deterministic learning model. For example, based on criticality of IoT edge device health, the processes (i.e., services, engines, algorithms) of AI/ML model 120, predict IoT edge device life span using failure rate (λ) derived by the probability of a Poisson Distribution algorithm.

Referring to FIG. 3, implementations provide for the data from analysis engines 124 to be stored in a processed analysis data farm 320. The data farm 320 can include current as well as archived analyzed data. In certain implementations, analyzed data from analysis engines 124 is sent to an RMQ broker 322 before being processed by algorithms 126. Referring to FIG. 5, an example algorithm 500 is shown.

Implementations provide for data from analysis engines 124 received by RMQ broker 322 to be published to the respective RMQ queues on each of processing and following services of analysis engines 124 for further determination of data anomalies, tampering, malfunction detection, etc.

Referring to FIG. 3, results of algorithms 126 can be stored in data farm 320. The data which is processed information is cached to the data farm 320 and provides historical data forensics. The data farm 320 can be accessed clouding computing 310, which can support a data center of a service provider or an entity.

In various implementations, results of algorithms 126 are received by RMQ broker 322 and sent to a notification handler 324. Recommendations and results can be provided by notification handler 324 by various methods, such email notification, SMS message, REST message, printed reports, etc.

Implementations provide that before a recommendation/prediction that an IoT edge device 302 is to be retired/replaced, verification services in algorithms 126 inspects the device and explore all possibilities for repairing and returning the IoT edge device 302 to the proper health state sensitive to each make and model of the devices using the processes of AI/ML model 120 based on captured history of the IoT edge device 302

Figure 6:
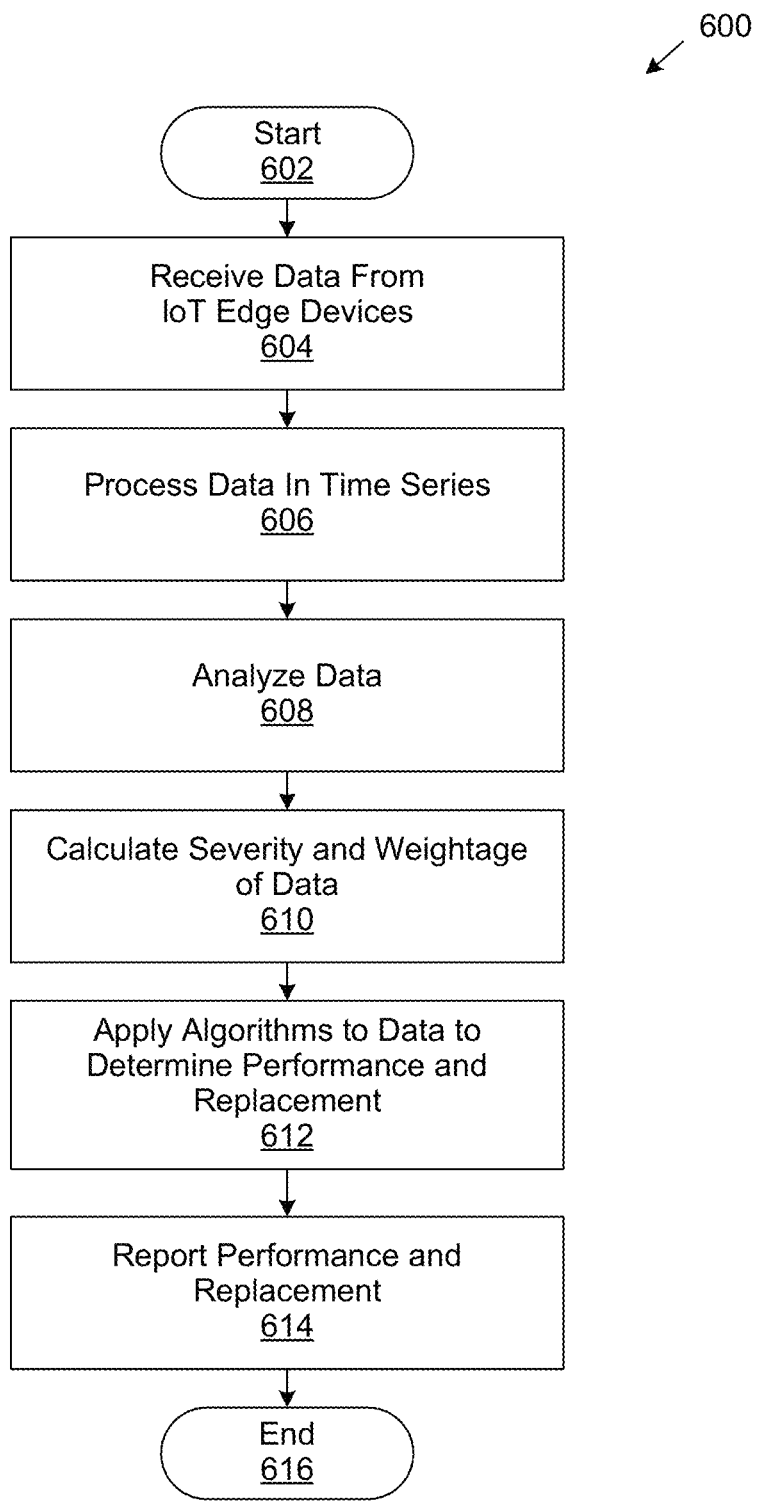
FIG. 6 is a generalized flowchart for monitoring the performance of IoT edge devices.

FIG. 6 shows a generalized flowchart for monitoring the performance of IoT edge devices. Implementations provide for the steps of process 600 to be performed by the AI/ML model 120. The order in which the method is described is not intended to be construed as a limitation, and any number of the described method steps may be combined in any order to implement the method, or alternate method. Additionally, individual steps may be deleted from the method without departing from the spirit and scope of the subject matter described herein. Furthermore, the method may be implemented in any suitable hardware, software, firmware, or a combination thereof, without departing from the scope of the invention.

At step 602, the process 600 starts. At step 604, data from multiple IoT edge devices of an edge computing network are received. The data can be received through the API gateway 308 described herein. AI/ML model 120 can receive time series data, health data, event data, etc.

At step 606, the data is processed based several data types, such as event data, incident data, time series data, device log data, device health data, etc.

At step 608, the data is analyzed through various services and engines, such as noisy nearby neighbor device(s), health score, performance impact time range, etc.

At step 610, severity and weightage are calculated for the processed and analyzed data. At step 612, algorithms are applied to the data with severity and weightage to determine performance and replacement recommendation for the IoT edge devices.

At step 614, reporting of performance and replacement is performed using one or more services. At step 316, the process 600 ends.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or step diagrams of methods, apparatus (systems) and computer program products according to embodiments of the invention. It will be understood that each step of the flowchart illustrations and/or step diagrams, and combinations of steps in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram step or steps.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for monitoring the performance of IoT edge devices comprising:
    receiving data by an AI/ML model implemented in an API gateway, from multiple IoT edge devices in an edge computing network through the API gateway, wherein the AI/ML model is trained by:
        processing the data in time series with a data processing component of the AI/ML model, wherein data received by the AI/ML model is segmented into data from an RMQ listener by a data listener;
        providing the segmented data to an RMQ broker that provides RMQ queues for processing analysis engines of the AI/ML model;
        analyzing the processed data with the analysis engines of the AI/ML model, wherein the analysis engines include services and engines to determine performance of the IoT devices based on the processed data;
        determining severity and weightage of the processed and analyzed data by the AI/ML model; and
        applying algorithms of the AI/ML model to the data with severity and weightage to provide performance metrics and replacement recommendations; and
        providing by the AI/ML model performance metrics and recommendations through the API gateway as to performance metrics and recommendations for the IoT edge devices.

2. The computer-implementable method of claim 1, wherein the received data is stored for future processing by the AI/ML model.

3. The computer-implementable method of claim 1, wherein the data includes feature sets as to state of an IoT edge device, time received, error messages, category, frequency, CVSS, nearby device error status, error probability, and severity of error.

4. The computer-implementable method of claim 1, wherein analyzing the processed data includes noisy neighbor detection, health score, performance impact time range detection, residual lifetime calculation, and faulty device detection.

5. The computer-implementable method of claim 1 further comprising storing processed and analyzed data in a data farm that includes current and historical data.

6. The computer-implementable method of claim 1 further comprising reporting performance metrics and replacement recommendations through one or more services including email notification, SMS message, REST message, and printed reports.

7. A system comprising:
a plurality of processing systems communicably coupled through a network, wherein the processing systems include non-transitory, computer-readable storage medium embodying computer program code interacting with a plurality of computer operations monitoring the performance of IoT edge devices comprising:
receiving data by an AI/ML model implemented in an API gateway, from multiple IoT edge devices in an edge computing network through the API gateway, wherein the AI/ML model is trained by:
processing the data in time series with a data processing component of the AI/ML model, wherein data received by the AI/ML model is segmented into data from an RMQ listener by a data listener;
providing the segmented data to an RMQ broker that provides RMQ queues for processing analysis engines of the AI/ML model;
analyzing the processed data with the analysis engines of the AI/ML model, wherein the analysis engines include services and engines to determine performance of the IoT devices based on the processed data;
determining severity and weightage of the processed and analyzed data by the AI/ML model; and
applying algorithms of the AI/ML model to the data with severity and weightage to provide performance metrics and replacement recommendations; and
providing by the AI/ML model performance metrics and recommendations through the API gateway as to performance metrics and recommendations for the IoT edge devices.

8. The system of claim 7, received data is stored for future processing by the AI/ML model.

9. The system of claim 7, wherein the data includes feature sets as to state of an IoT edge device, time received, error messages, category, frequency, CVSS, nearby device error status, error probability, and severity of error.

10. The system of claim 7, wherein analyzing the processed data includes noisy neighbor detection, health score, performance impact time range detection, residual lifetime calculation, and faulty device detection.

11. The system of claim 7 further comprising storing processed and analyzed data in a data farm that includes current and historical data.

12. The system of claim 7 further comprising reporting performance metrics and replacement recommendations through one or more services including email notification, SMS message, REST message, and printed reports.

13. A non-transitory, computer-readable storage medium embodying computer program code for monitoring the performance of IoT edge devices, the computer program code comprising computer executable instructions configured for:
receiving data by an AI/ML model implemented in an API gateway, from multiple IoT edge devices in an edge computing network through the API gateway, wherein the AI/ML model is trained by:
processing the data in time series with a data processing component of the AI/ML model, wherein data received by the AI/ML model is segmented into data from an RMQ listener by a data listener;
providing the segmented data to an RMQ broker that provides RMQ queues for processing analysis engines of the AI/ML model;
analyzing the processed data with the analysis engines of the AI/ML model, wherein the analysis engines include services and engines to determine performance of the IoT devices based on the processed;
determining severity and weightage of the processed and analyzed data by the AI/ML model; and
applying algorithms of the AI/ML model to the data with severity and weightage to provide performance metrics and replacement recommendations; and
providing by the AI/ML model performance metrics and recommendations through the API gateway as to performance metrics and recommendations for the IoT edge devices.

14. The non-transitory, computer-readable storage medium of claim 13, wherein the received data is stored for future processing by the AI/ML model.

15. The non-transitory, computer-readable storage medium of claim 13, wherein the data includes feature sets as to state of an IoT edge device, time received, error messages, category, frequency, CVSS, nearby device error status, error probability, and severity of error.

16. The non-transitory, computer-readable storage medium of claim 13, wherein analyzing the processed data includes noisy neighbor detection, health score, performance impact time range detection, residual lifetime calculation, and faulty device detection.

17. The non-transitory, computer-readable storage medium of claim 13 further comprising storing processed and analyzed data in a data farm that includes current and historical data.

* * * * *